Nov. 23, 1926.
L. P. GROVES
1,608,276
STEERING ARM AND DRAG LINK CONNECTION
Filed Feb. 4, 1926
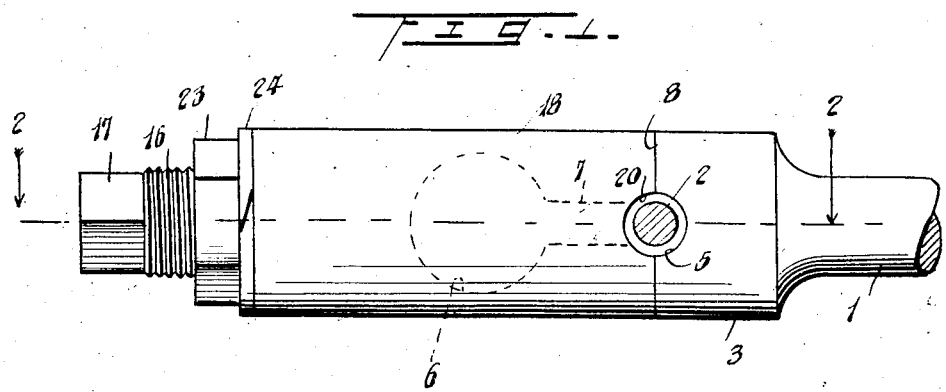
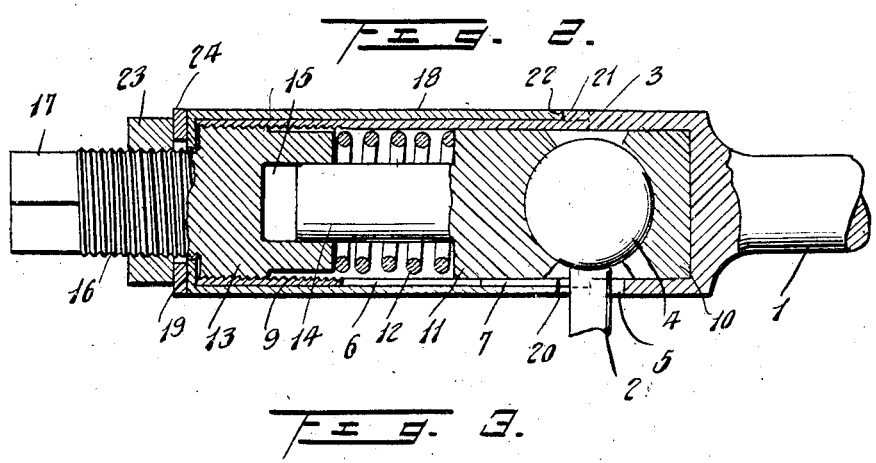
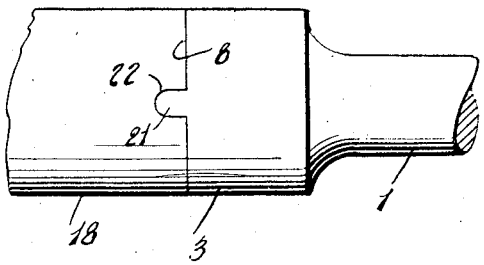
Inventor
L. P. Groves
By
Attorney Patented Nov. 23, 1926.

1,608,276

UNITED STATES PATENT OFFICE.

LESTER P. GROVES, OF TERRA ALTA, WEST VIRGINIA.

STEERING ARM AND DRAG-LINK CONNECTION.

Application filed February 4, 1926. Serial No. 85,993.

This invention relates to drag links for automobile steering gears, and more particularly to the means by which the links are pivotally and yieldably connected to the steering shaft and steering knuckle arms.

The invention has for one of its objects the provision of a drag link having means of the character stated which shall be simple, durable and highly efficient and which can be readily adjusted to take up wear and locked in adjusted position.

A further object of the invention is the provision of means of the character stated which shall include a novel and simple member adapted to protect the same against dirt and water.

With the foregoing and other objects in view, the invention consists of the novel construction, combination and arrangement of parts hereinafter fully described and claimed, and illustrated in the accompanying drawing, wherein:

Figure 1 is an elevational view of a fragmentary portion of a drag link embodying my invention, Figure 2 is a sectional view taken on the plane indicated by the line 2—2 of Figure 1, and Figure 3 is a detail view illustrating the manner in which the dirt and water excluding sleeve is held against rotary movement with respect to the drag link.

Corresponding and like parts are referred to in the following description, and designated in the several views of the accompanying drawing, by similar reference characters.

In the drawing, 1 designates a drag link and 2 a steering shaft or steering knuckle arm, the former having an enlarged hollow end portion 3 for the reception of the spherical end 4 of the latter. The end portion 3 is provided in a side thereof with an opening 5 for the reception of the arm 2, an opening 6 to permit the end 4 to be placed in the end portion 3, and a slot 7 to permit the arm 2 to be carried into the opening 5 after the end 4 has been placed in the end portion 3 through the opening 6. The end portion 3 is provided at its inner end with an exterior annular shoulder 8 and at its outer end with interior screw threads 9.

Socket blocks 10 and 11 located within the end portion 3, are arranged at opposite sides of and constitute a bearing for the end 4. The block 10 bears against the inner end of the end portion 3, and the block 11 is held against the end 4 and the latter against the block 10 by a spring 12 which is positioned between a nut 13 and the block 11. The block 11 is provided with a stem 14 which fits in a recess 15 in the inner side of the nut 13 and upon which the spring 12 is mounted. The nut 13 is provided at its outer side with a threaded stem 16 having a polygonal outer end 17.

A sleeve 18 is removably positioned upon the outer side of the end portion 3 and abuts at its inner end against the shoulder 8. The outer end of the sleeve 18 is provided with an inwardly directed flange 19 which bears against the outer end of the end portion 3. The sleeve 18 closes the opening 6 and slot 7 and is provided at its inner end with a notch 20 registering with the opening 5. The sleeve 18 is held against casual rotation with respect to the end portion 3 by a lug 21 projecting from the shoulder 8 and fitting in the notch 22 in the inner end of the sleeve. A nut 23 mounted on the stem 16 holds the sleeve 18 against casual endwise movement with respect to the end portion 3 and secures the nut 13 against casual movement with respect to the end portion 3. A lock washer 24 is positioned between the outer end of the sleeve 18 and the nut 23.

From the foregoing description, taken in connection with the accompanying drawing, it will be understood that since the sleeve 18 closes the opening 6 and slot 7 it functions to exclude dirt and water from the interior of the end portion 3; that the tension of the spring 12 may be regulated through the medium of a wrench applied to the polygonal end 17 of the stem 16, and that since the sleeve 18 is held against casual rotation with respect to the end portion 3 it will not interfere with the free movement of the arm 2 with respect to said portion. The parts of the device may be readily assembled and readily taken apart for repair or replacement. The other end of the drag link 1 will preferably involve the construction shown.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

1. In combination, a drag link having a hollow end provided in a side thereof with openings and a connecting slot, said end being provided with a lug, an arm extending through one of the openings and having an enlarged end pivoted within the end of the drag link, a sleeve removably positioned upon said end of the drag link and closing the other of said openings and the slot and provided with a notch receiving said lug, and means holding the sleeve against endwise movement with respect to the drag link.

2. In combination, a drag link having a hollow end portion provided in a side thereof with openings and a connecting slot, a lug carried by the inner end of said end portion, socket blocks located within said end portion, an arm projecting through one of said openings and having a spherical end journaled in said blocks, a stem carried by one of the socket blocks, a spring bearing against said socket blocks and passing about the stem, a nut threaded in said end portion and provided with an outwardly extending threaded stem, a sleeve removably mounted upon said end portion over one of said openings and slot and provided in its inner end with a notch registering with the other opening, said end of the sleeve being provided with a notch receiving said lug and the outer end of the sleeve being provided with a flange engaging the outer end of said end portion, and a nut mounted upon the threaded stem and engaging the outer end of the sleeve.

In testimony whereof I affix my signature.

LESTER P. GROVES.